United States Patent
Macmillan et al.

(10) Patent No.: US 10,873,708 B2
(45) Date of Patent: Dec. 22, 2020

(54) PHASED CAMERA ARRAY SYSTEM FOR GENERATION OF HIGH QUALITY IMAGES AND VIDEO

(71) Applicant: GoPro, Inc., San Mateo, CA (US)

(72) Inventors: Timothy Macmillan, La Honda, CA (US); Balineedu Chowdary Adsumilli, San Francisco, CA (US)

(73) Assignee: GOPRO, INC., San Mateo, CA (US)

( * ) Notice: Subject to any disclaimer, the term of this patent is extended or adjusted under 35 U.S.C. 154(b) by 56 days.

(21) Appl. No.: 15/863,638

(22) Filed: Jan. 5, 2018

(65) Prior Publication Data

US 2018/0198989 A1  Jul. 12, 2018

Related U.S. Application Data

(60) Provisional application No. 62/445,640, filed on Jan. 12, 2017.

(51) Int. Cl.
| | | |
|---|---|---|
| *H04N 7/18* | (2006.01) | |
| *H04N 5/247* | (2006.01) | |
| *H04N 5/265* | (2006.01) | |
| *H04N 5/232* | (2006.01) | |

(52) U.S. Cl.
CPC ......... *H04N 5/247* (2013.01); *H04N 5/23238* (2013.01); *H04N 5/265* (2013.01); *H04N 7/18* (2013.01); *H04N 5/23229* (2013.01)

(58) Field of Classification Search
CPC ...... H04N 7/18; H04N 5/247; H04N 5/23238; H04N 5/265; H04N 5/23229

USPC .................................................. 348/159, 135
See application file for complete search history.

(56) References Cited

U.S. PATENT DOCUMENTS

| | | | | |
|---|---|---|---|---|
| 8,279,283 | B2* | 10/2012 | McCormack | G08B 13/196 348/135 |
| 9,189,858 | B2* | 11/2015 | Svanholm | G01C 1/04 |
| 9,600,863 | B2* | 3/2017 | Xiong | G06T 3/60 |
| 10,091,418 | B2* | 10/2018 | Alvarado-Moya | G06T 3/4038 |
| 2011/0035174 | A1* | 2/2011 | Lahiri | G01C 25/00 702/94 |
| 2015/0098616 | A1* | 4/2015 | Gervautz | G06T 7/70 382/103 |
| 2015/0262380 | A1* | 9/2015 | Grasmug | G06T 7/207 382/107 |

* cited by examiner

*Primary Examiner* — Trang U Tran
(74) *Attorney, Agent, or Firm* — Gazdzinski & Associates, PC

(57) ABSTRACT

A phased camera array captures images from a plurality of image sensor assemblies, each image sensor assembly capturing at a framerate and a resolution. The phased camera array is configured to generate images captured from the independent image sensor assemblies to be stitched into a single composite image with a higher resolution than the independent images. The higher resolution composite images can then be phased together to generate a video with a higher framerate than what the independent images were captured at. The image sensor assemblies of the camera system are positioned in such a way to minimize the footprint of the camera system and minimize negative effects from image stitching and video phasing.

21 Claims, 12 Drawing Sheets

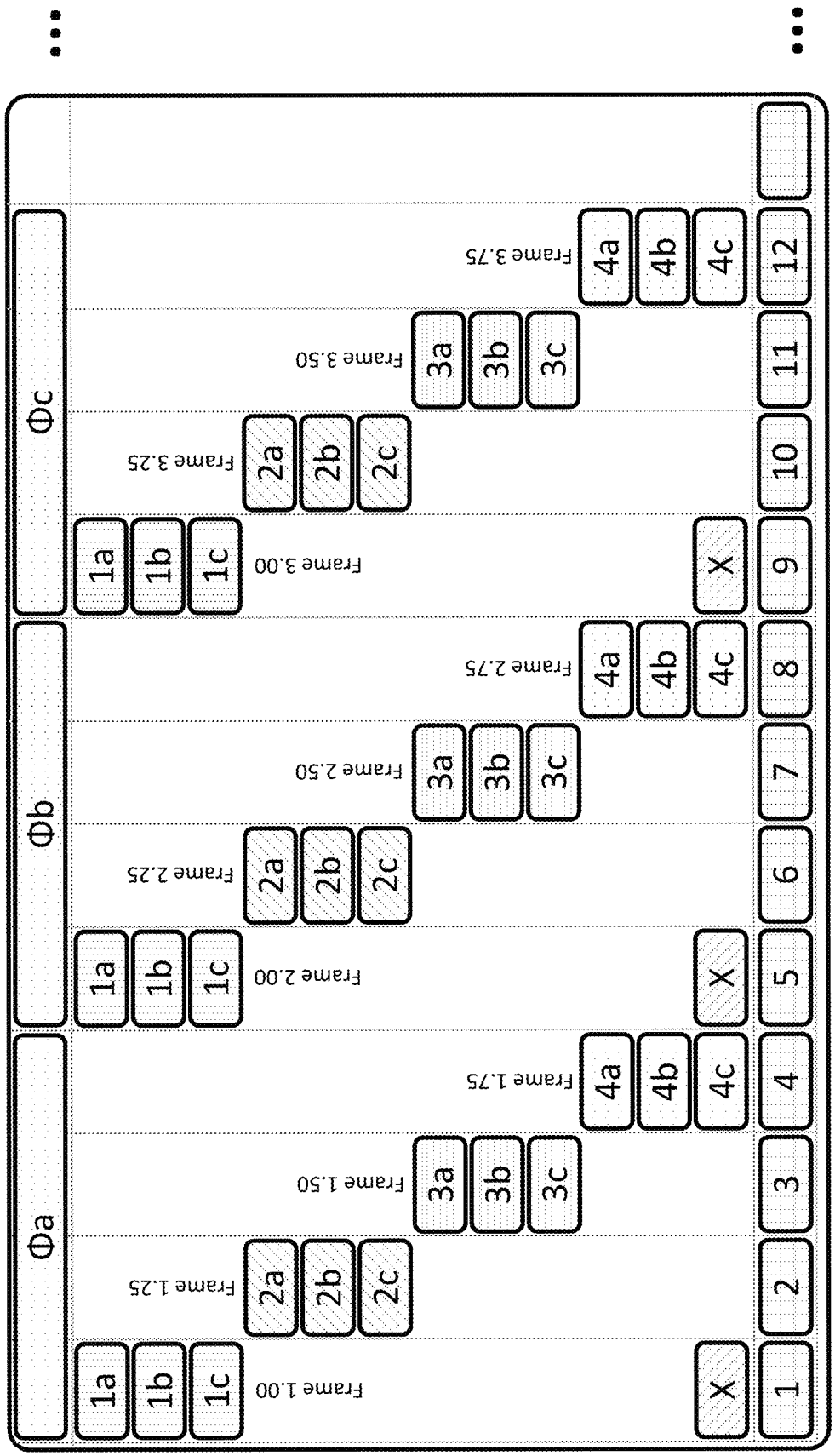

PHASED CAMERA ARRAY SYSTEM FOR GENERATION OF HIGH QUALITY IMAGES AND VIDEO

CROSS REFERENCE TO RELATED APPLICATIONS

This application claims the benefit of U.S. Patent Application No. 62/445,640, filed Jan. 12, 2017, the content of which is hereby incorporated by reference in its entirety.

FIELD

This description generally relates to multiple camera systems, specifically systems that generate high quality images and video from disparate sources.

BACKGROUND

Digital cameras are becoming more pervasive in the field of activity focused photography and videography. As their popularity has increased, so has the capability of the hardware, firmware, and software used for capturing the images and controlling the camera operation. The resolution of the image sensors and the frame rates of the images taken as videos has increased manifold in the past decade. Current cameras are capable of taking images at 4K pixel resolution at up to 120 frames per second (fps). However, current cameras capable of taking images and videos at such high resolution and frame rates are very expensive and cost prohibitive to digital camera users.

Additionally, complex multi-camera systems have been introduced with the increasing prevalence of digital cameras. Traditionally, multi-camera systems are used to capture unique viewpoints or combinations of viewpoints of an event. The multi-camera systems can also be configured to communicate with one another such that the viewpoints may be interlaced for output video streams. However, these output video streams are videos that transition from viewpoint to viewpoint of the cameras and do not increase capability of the camera system much above the individual independent cameras.

SUMMARY

In one aspect of the present disclosure, a camera system is disclosed. In one embodiment, the camera system includes: a keyframe assembly configured to capture images during operation; a plurality of image sensor assemblies positioned at a plurality of image sensor points, the plurality of image sensor assemblies positioned such that, for the given sensor subset, a pair of sensor points of the plurality of sensor points between adjacent image sensor assemblies form a representative boundary line, the representative boundary lines formed between the sensor points form a representative boundary area, and the reference point of the keyframe assembly is within the representative boundary area.

In another aspect of the present disclosure, method for generating a video from a camera system including a plurality of image sensor assemblies is disclosed. In one embodiment, the method includes: capturing a first reference image from a keyframe image sensor; capturing a first set of simultaneous images from a first subset of the plurality of image sensor assemblies; combining the first set of simultaneous images into a first composite image; capturing a second set of simultaneous images from a second subset of the plurality of image sensor assemblies; combining the second set of simultaneous images into a second composite image; generating a first composite video segment by joining the first composite image and the second composite image; and outputting the first composite video segment.

In another aspect of the present disclosure, a computer program product is disclosed. In one embodiment, the computer program product is for generating a video from a camera system including a plurality of image sensor assemblies, the computer program product including a non-transitory machine-readable medium storing computer program code, the program code being configured to, when executed by at least one processor, cause the camera system to: capture a first reference image from a keyframe image sensor; capture a first set of simultaneous images from a first subset of the plurality of image sensor assemblies; combine the first set of simultaneous images into a first composite image; capture a second set of simultaneous images from a second subset of the plurality of the image sensor assemblies; combine the second set of simultaneous images into a second composite image; generate a first composite video segment by joining the first composite image and the second composite image; and output the first composite video segment.

BRIEF DESCRIPTION OF DRAWINGS

The disclosed embodiments have other advantages and features which will be more readily apparent from the following detailed description of the invention and the appended claims, when taken in conjunction with the accompanying drawings, in which:

Figures (FIGS. 1A, 1B, 1C, and 1D are isometric views of a camera system configured to capture images in a phased camera array, according to one example embodiment.

FIG. 7C illustrates the generation of the video stream from composite video frames, according to one example embodiment.

DETAILED DESCRIPTION

Figure 1A:
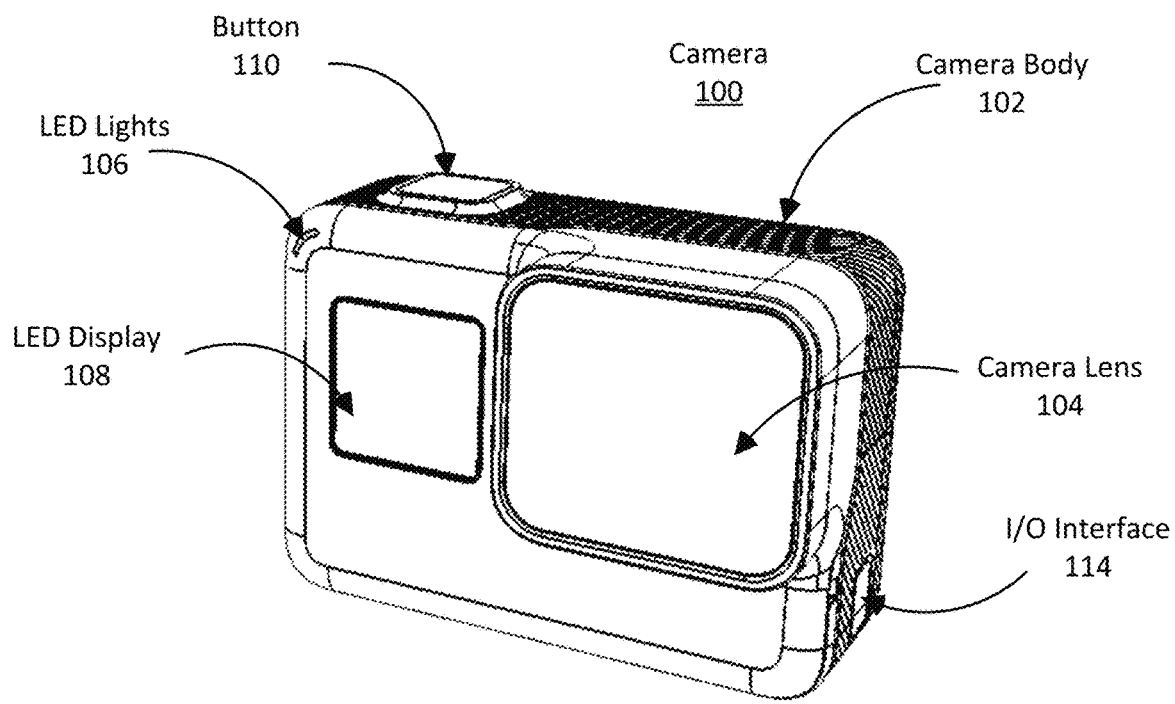
Figure 1B:
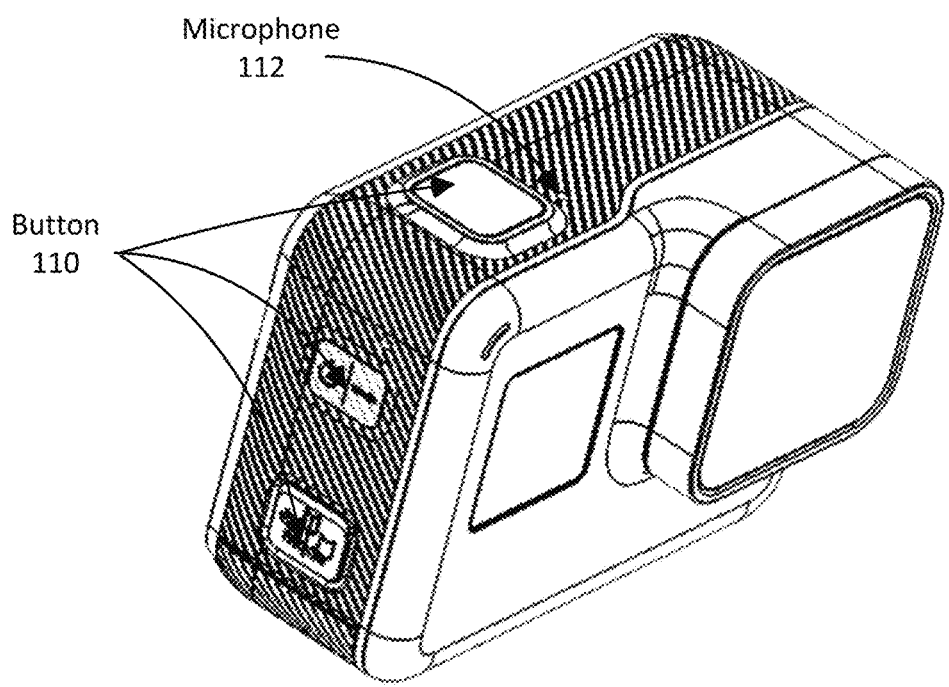
Figure 1C:
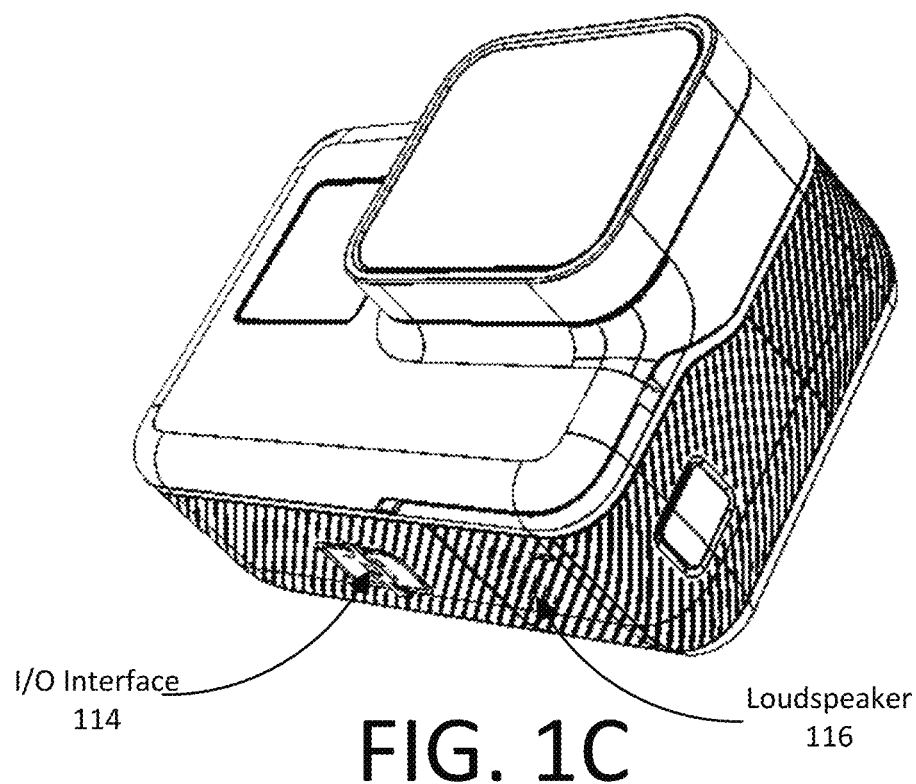
Figure 1D:
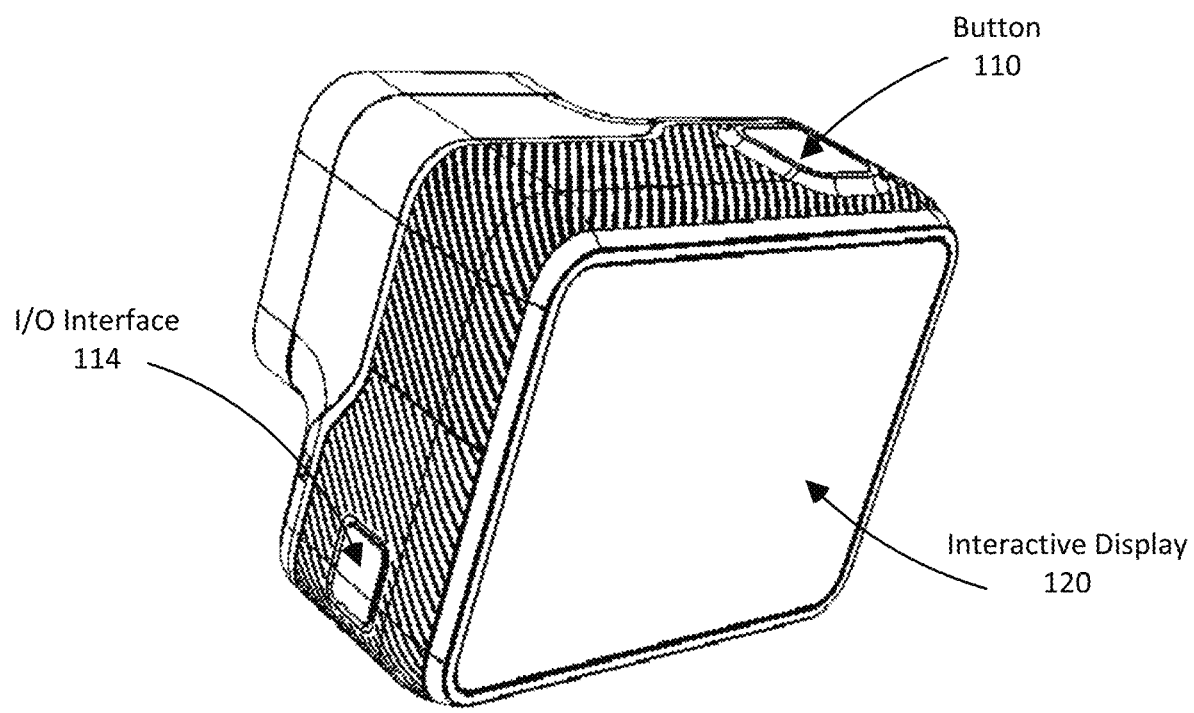

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A phased camera array system captures images from a plurality of image sensor assemblies. The image sensor assemblies can each capture images with at least one framerate and resolution. The resolutions and framerates of the independently captured images of the image sensor assemblies are at one value, but the images may be combined in a way to increase the resolution and framerate of the images to a higher value. As one example, eight image sensor assemblies in a camera array capture images at 360p resolution and 15 fps. The image sensor assemblies may be configured such that the resulting video stream from the camera system is at 4K resolution and 120 fps.

In one embodiment, a camera system captures image and video content from a plurality of image sensor assemblies in a single array. The camera system comprises an image sensor assembly identified as the keyframe image sensor assembly located at a reference point. Each of the remaining image sensors are positioned at a respective sensor point. The plurality of image sensors assemblies can be grouped into at least two sensor subsets, e.g. a first subset and a second subset, etc. The sensor points of each subset can be centrally located about the reference point such that the sensor points between adjacent image sensor assemblies of each subset form a representative boundary line. The representative boundary lines formed between the sensor points form a representative boundary area. The sensor points can be further positioned such that the reference point may be collinear to the representative boundary lines or within the representative boundary area formed by the representative the boundary lines.

In this embodiment, there is a processor coupled to the image sensor assemblies for controlling their operation and configuring their capture modes. To create a phased video, the keyframe image assembly captures a reference image. The first subset of image sensor assemblies simultaneously captures an image from each sensor in the subset and combines the images from each sensor in the subset into a first composite image. The second subset of image sensor assemblies simultaneously captures an image from each sensor in the subset and combines the images from each sensor in the subset into a first composite image. The first and second composite images are compared to the reference image to reduce detrimental image stitching effects. The first and second composited images are then stitched together to create a first composite video and is then outputted.

In one embodiment, the image sensor assemblies are positioned in a substantially circular shape with the keyframe image sensor assembly approximately at the center point of the circle. In a different embodiment, the image sensor assemblies are positioned in a substantially cross shape with the keyframe image assembly at the intersection of the two segments of the cross. In still another embodiment, the image sensor assemblies are positioned in a substantially rhomboidal shape, with the keyframe image sensor assembly approximately at the center point of the rhomboid. The rhomboidal system may comprise 12 image sensor assemblies and a keyframe image sensor assembly positioned in a diamond shape of five rows and five columns.

The image sensor assemblies of the camera array can be independently configured such that at least the following configurations may occur: every camera in the array is capturing images at a unique framerate and resolution; every camera in the array is capturing images at a the same framerate and resolution; each camera in a subset of cameras is capturing images at the same framerate and resolution; and each camera of a subset of cameras is capturing images at the same framerate and resolution with each subset independently configurable.

The images captured by the image sensor assemblies are stitched into composite images such that the resolutions of the composite images are a higher resolution than the resolution that images were captured at. The images captured by the image sensor assemblies are phased into composite video segment such that the composite video has a higher framerate than framerate that the images were captured at.

Additional embodiments are described in further detail below.

Example Camera Configuration

Referring now to FIGS. 1A-1D, these illustrate an embodiment of an example camera 100 that may be used in a phased camera array. The illustrated camera is provided as an example, but does not necessarily reflect the configuration of cameras used in camera arrays described herein. Further, camera arrays can include cameras with configurations that are substantially similar, or dissimilar, to one another as part of the camera array.

The camera 100 may comprise a camera body 102 having a camera lens 104 structured on a front surface of the camera body, various indicators on the front of the surface of the camera body 102 (such as LEDs, displays, and the like), various input mechanisms (such as buttons, switches, and touch-screen mechanisms), and electronics (e.g., imaging electronics, power electronics, etc.) internal to the camera body 102 for capturing images via the camera lens and/or performing other functions. The camera 100 may be configured to capture images and video, and to store captured images and video for subsequent display or playback. The camera body 102, can be an exterior that encompasses and protects the camera's internal electronics, which are further described in later sections.

The camera 100 can include various indicators, including the LED lights 106 and the LED display 108. The camera 100 can also include buttons 110 configured to allow a user of the camera to interact with the camera, to turn the camera on, and to otherwise configure the operating mode of the camera. The camera 100 can also include a microphone 112 configured to receive and record audio signals in conjunction with recording video. The side of the camera 100 may include an I/O interface 114. The camera may also include a loudspeaker 116 system integrated into the camera housing. The front surface of the camera may include two drainage ports as part of a drainage channel 118 for the camera audio system. The camera can include an interactive display 120 that allows for interaction with the camera while simultaneously displaying camera information on a surface of the camera. As illustrated, the camera 100 may include a lens 104 configured to receive light incident upon the lens and to direct received light onto an image sensor internal to the lens.

Additional camera features, such as the features described above, may be affixed to an exterior of the camera. In some embodiments, the camera described herein includes features other than those described below. For example, instead of a single interface button, the camera can include additional buttons or different interface features, such as a multiple microphone openings to receive voice or other audio commands.

Example System Configuration

Figure 2:
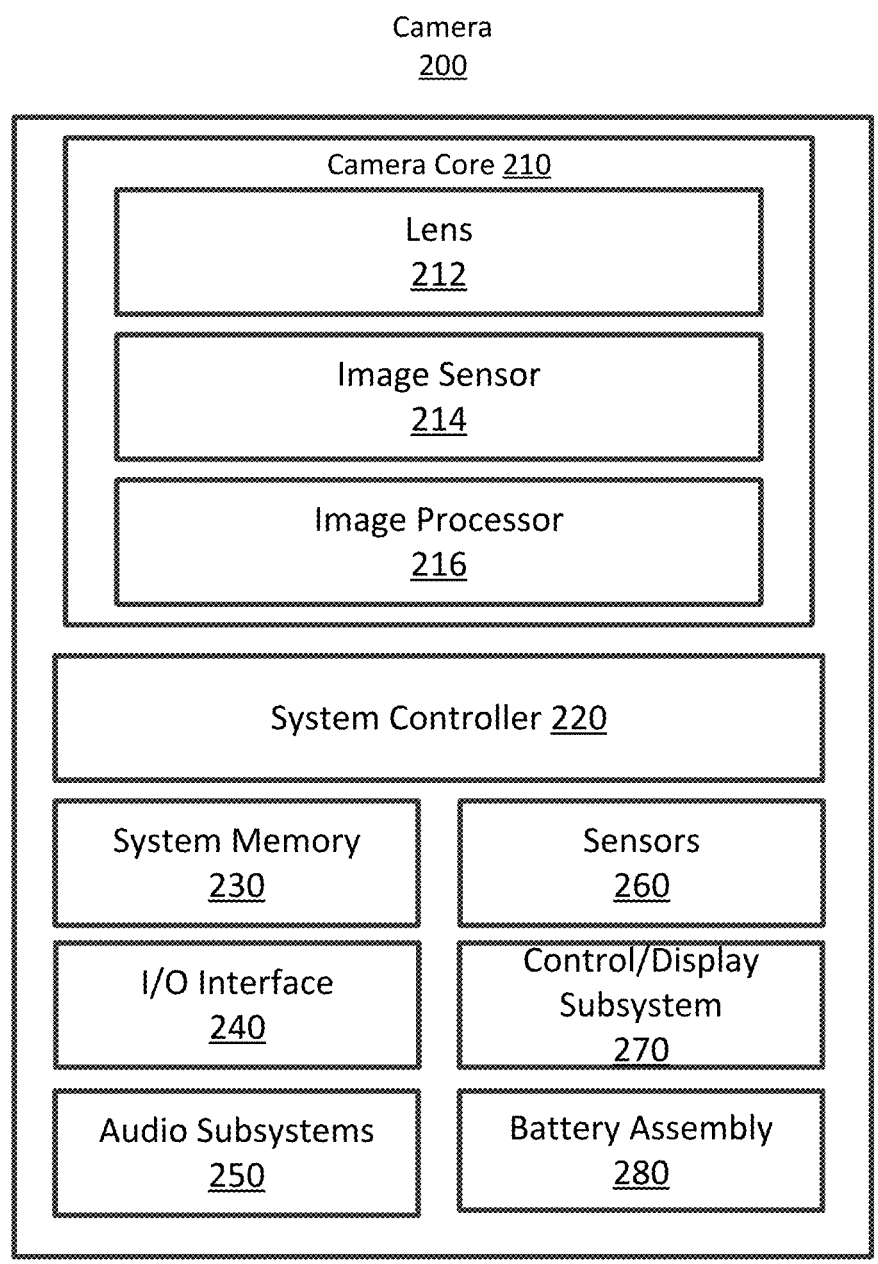
FIG. 2 illustrates camera architecture, according to one example embodiment.

FIG. 2 is a block diagram illustrating a system level example camera 200 corresponding to the camera demonstrated in FIGS. 1A-1D that may be used for a camera array. The camera 200 includes a camera core 210, a system controller 220, a system memory 230, an I/O interface 240, an audio subsystem 250, sensors 260, a control/display subsystem 270, and a battery assembly 280. The camera core includes a lens 212, an image sensor 214, and an image processor 214. The components in FIG. 2 are grouped functionally and do not necessarily reflect a physical architecture of the camera 200. For example, as described above, in one example embodiment, the control/display subsystem 270 is embodied in a separate physical integrated circuit chip from the image processor 216. The integrated circuit chip including the image processor 216 may also include, for example, the image sensor 212, the system controller 220, system memory 230 and portions of the audio sub-system 250, I/O interface 240, and control/display sub-system 270.

In the example embodiment illustrated in FIG. 2, the camera 200 may include a camera core 210 having a lens 212, an image sensor 214, and an image processor 216. The camera 200 additionally includes a system controller 220 (e.g., a microcontroller or microprocessor) that controls the operation and functionality of the camera 200 and system memory 230 configured to store executable computer instructions that, when executed by the system controller 220 and/or the image processors 216, perform the camera functionalities described hereafter. In some example embodiments, a camera 200 may include multiple camera cores 210 to capture fields of view in different directions which may then be stitched together to form a cohesive image. For example, in an embodiment of a spherical camera system, the camera 200 may include two camera cores 210 each having a hemispherical or hyper hemispherical lens that each capture a hemispherical or hyper-hemispherical field of view which are stitched together in post-processing to form a spherical image.

The lens 212 can be, for example, a wide angle lens, hemispherical, or hyper hemispherical lens that focuses light entering the lens to the image sensor 214 which captures images and/or video frames. The image sensor 214 may capture high-definition video having a resolution of, for example, 720p, 1080p, 4k, or higher. For video, the image sensor 214 may capture video at frame rates of, for example, 30 frames per second, 60 frames per second, or higher. The image processor 216 performs one or more image processing functions of the captured images or video. For example, the image processor 216 may perform a Bayer transformation, de-mosaicing, noise reduction, image sharpening, image stabilization, rolling shutter artifact reduction, color space conversion, compression, or other in-camera processing functions. The image processor 216 may furthermore perform the timing metric calculations. Processed images and video may be temporarily or persistently stored to system memory 230 and/or to a non-volatile storage, which may be in the form of internal storage or an external memory card. Additionally, the image processor may be configured to capture video or images and store them in the system memory 230.

An input/output (I/O) interface 240 may transmit and receive data from various external devices. For example, the I/O interface 240 may facilitate the receiving or transmitting video or audio information through an I/O port. Examples of I/O ports or interfaces include USB ports, HDMI ports, Ethernet ports, audio ports, and the like. Furthermore, embodiments of the I/O interface 240 may include wireless ports that can accommodate wireless connections. Examples of wireless ports include Bluetooth, Wireless USB, Near Field Communication (NFC), and the like. The I/O interface 240 also may include an interface to synchronize the camera 200 with other cameras or with other external devices, such as a remote control, a second camera, a smartphone, a client device, or a video server.

Sensors 260 may capture various metadata concurrently with, or separately from, video capture. For example, the sensors 260 may capture time-stamped location information based on a global positioning system (GPS) sensor, and/or an altimeter. Other sensors 260 may be used to detect and capture orientation of the camera 200 including, for example, an orientation sensor, an accelerometer, a gyroscope, or a magnetometer. Additional sensors may be used to detect and capture information about the camera system such as internal or external temperature of camera components such as the camera core, the system controller or the battery assembly. The sensors may additionally detect the presence of liquids within or external to the camera body or the proximity of liquids to camera components. The sensors additionally may collect information about the pressure internal or external the camera body.

Sensor data captured from the various sensors 260 may be processed to generate other types of metadata. For example, sensor data from the accelerometer may be used to generate motion metadata, comprising velocity and/or acceleration vectors representative of motion of the camera 200. Sensor data from a GPS sensor can provide GPS coordinates identifying the location of the camera 200, and the altimeter can measure the altitude of the camera 200. In one embodiment, the sensors 260 are rigidly coupled to the camera 200 such that any motion, orientation or change in location experienced by the camera 200 is also experienced by the sensors 260. The sensors 260 furthermore may associates a time stamp representing when the data was captured by each sensor. In one embodiment, the sensors 260 automatically begin collecting sensor metadata when the camera 200 begins recording a video. In still other embodiments the sensors may be external to the camera body and transmit the sensor data or sensor metadata to the camera via the I/O interface 240.

A control/display subsystem 270 includes various control and display components associated with operation of the camera 200 including, for example, LED lights, a display, buttons, microphones, speakers, and the like. The audio subsystem 250 includes, for example, one or more microphones and one or more audio processors to capture and process audio data correlated with video capture. In one embodiment, the audio subsystem 250 includes a microphone array having two or more microphones arranged to obtain directional audio signals.

The battery assembly 280 may include power cells for powering various components of the camera system. For example the power cells may be a Lithium-Ion battery, a Nickel-Cadmium battery, a Nickel-metal-Hydride battery, a Lithium-Polymer battery, a Lead-Acid battery, a solar-cell, a power cord to an external power source, a kinetic power generation system, or any other component used to power an electrical system. The battery assembly may be configured to be controlled by the system controller, with the system controller dictating which components of the camera subsystems and components will receive power during operation. The battery assembly may be controlled by various input mechanisms (such as buttons, switches, and touchscreen mechanisms) on the external body of the camera or by directions received via the I/O interface 240. Additionally, the battery assembly may removable from the camera system to allow for recharging the power cells of the battery assembly or replacing the current battery assembly with a different battery assembly.

Phased Camera Array

A phased camera array (PCA) may be any combination of cameras configured to sequentially take images and form a composite image or video. In the illustrated example embodiments, the PCA uses a combination of image stitching and a controlled sequential image capture to create a video sequence with high frame rates and large pixel sizes. The illustrated example embodiments below represent a camera system that performs, as a whole, better than any of the cameras that make up the system. The phased camera array may produce high resolution images and videos, high frame rate videos, images with depth information, videos with a zooming function, light-field images, images with multiple fields of view, stereo-3D images, multi-bandwidth images (e.g. red-green-blue (RGB), Infrared, Ultraviolet, etc.), or any other combination of image/video qualities that could be obtained from a camera system operating with more than one type of camera, e.g., a "super-camera."

Camera Arrays

Figure 3A:
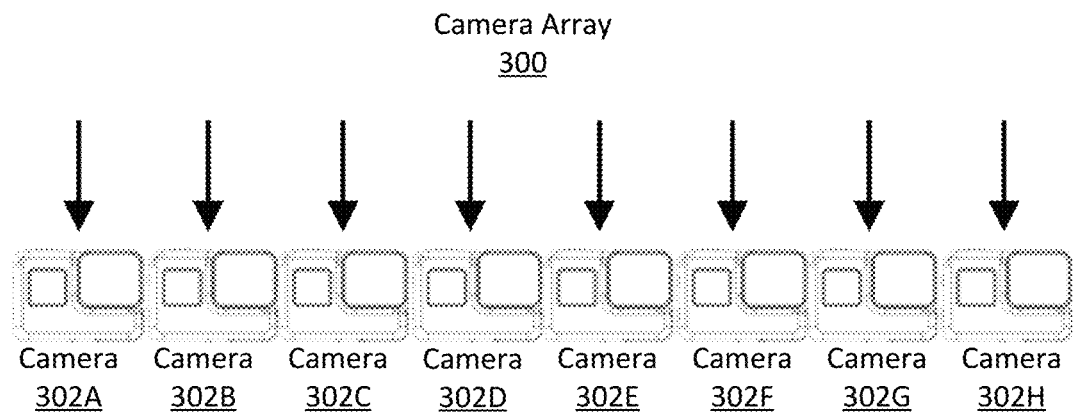
FIGS. 3A-3B illustrate one dimensional camera arrays, according to one example embodiment.
Figure 3B:
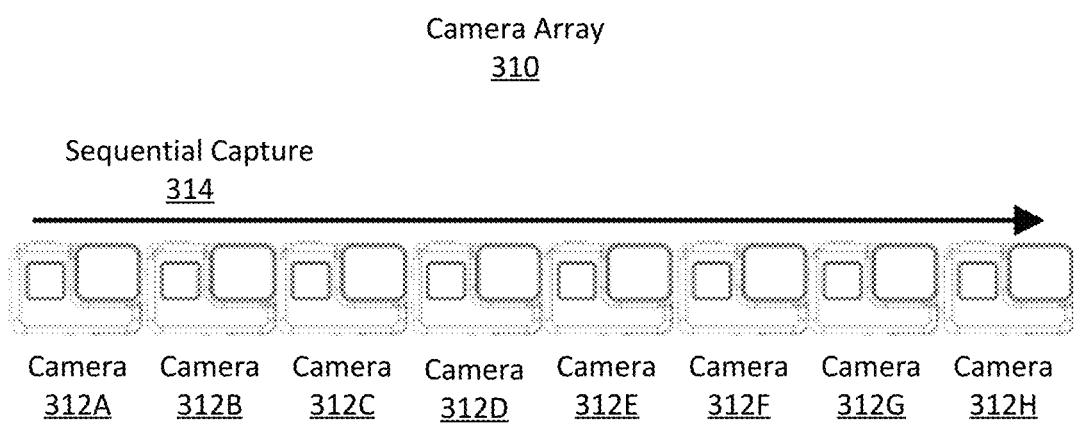

FIGS. 3A-3B demonstrate an example of a one dimensional camera array. FIG. 3A illustrates a camera array 300 is configured to simultaneously capture an image using the cameras 302A-302I1 of the array such that the captured images may be combined into a higher quality image, according to one example embodiment. Here, the black arrows indicate that all of the cameras 302A-302I1 simultaneously capture images. FIG. 3B illustrates a camera array 310 configured for sequentially taking images to create a video sequence when the images are composited together, according to one example embodiment. Here, the arrow represents that cameras 312A-312I1 sequentially capture 314 images from left to right (rather than simultaneously as in FIG. 3A). This concept is analogous to a single camera capturing multiple sequential images to create a video sequence.

Figure 3C:
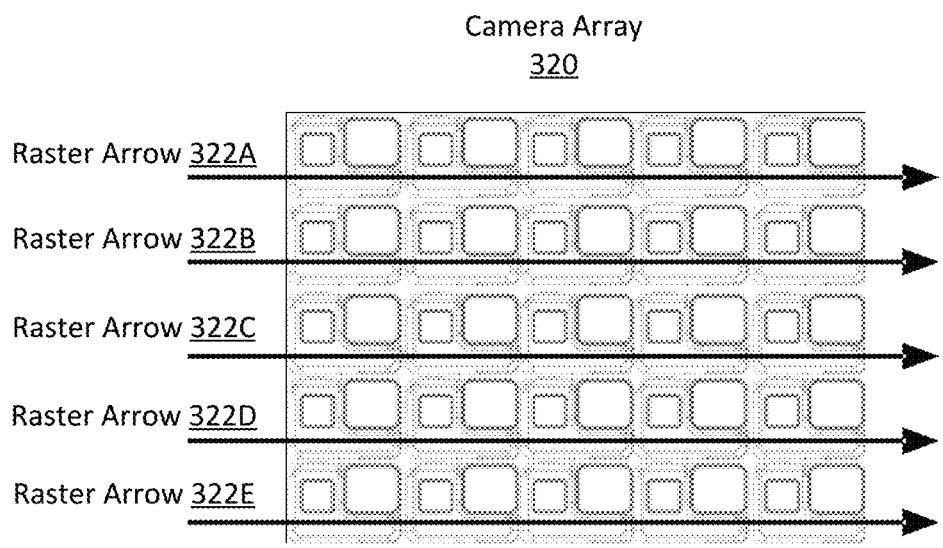
FIGS. 3C-3D illustrate two-dimensional camera arrays, according to one example embodiment.
Figure 3D:
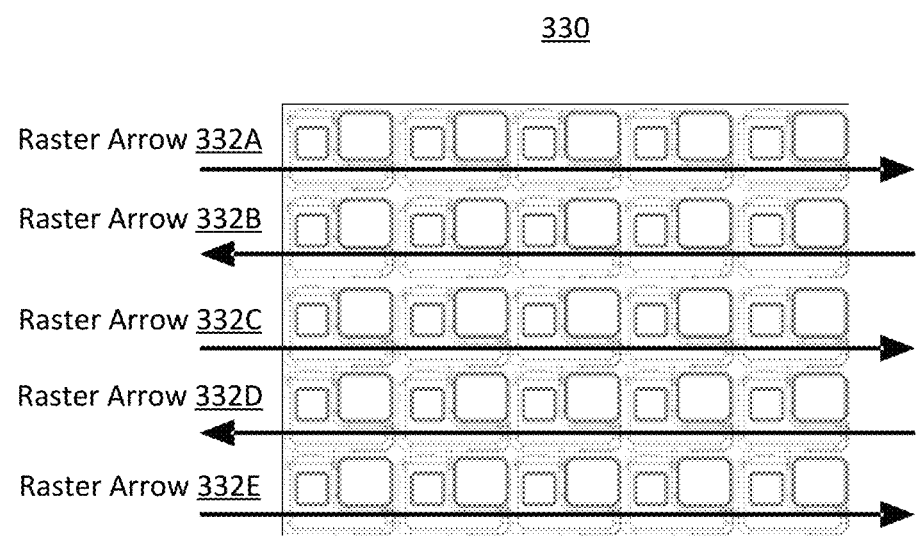

FIGS. 3C-3D illustrate examples of two dimensional camera arrays that may be configured to simultaneously capture an image (as in FIG. 3A) or that may sequentially capture images that may be stitched together (as in FIG. 3B) to create a composite video. FIG. 3C illustrates a first image capture sequence on a two dimensional camera array 330, according to one example embodiment. Here, the cameras of the camera array 330 sequentially capture images following the raster arrows 332A-332E (e.g. from left to right for each row from top to bottom). FIG. 3D illustrates a second image capture sequence on a two dimensional camera array 340, according to one example embodiment. In this embodiment, the cameras of the camera array 340 sequentially capture images following the raster arrows 332A-332E (e.g., from left to right and from right to left on alternating rows, from top to bottom).

Image Stitching

As camera technology has developed the number of pixels that digital cameras are able to capture has increased. However, even with larger pixel counts users desire to capture images with more pixels than the camera is able to capture, or to use pixels from multiple captured images in the same image. For example, many standard modern digital camera technology are able to capture panoramas, high resolution images, photo mosaics, etc. However, standard modern camera technology is unable to easily leverage additional pixel information captured from multiple cameras in a phased camera array (PCA).

Cameras in a PCA may use electronic components internal to the cameras to create composite images from several different cameras within the PCA. Generally, the PCA generates a composite image using image stitching techniques. The composite image includes a greater number of pixels, or, more generally, is higher quality, than the number of pixels, or quality, in an individual camera of the array. As an example, in this section, image stitching to will be described with two cameras of a PCA, but similar techniques can be used to stitch images from any number of cameras in a PCA.

To stitch images captured by PCA cameras into a higher resolution image, a first camera of the PCA $C_1$ captures a first image $I_1$ and a second camera of the PCA $C_2$ captures a second image $I_2$. System controllers 220 of two cameras in the PCA may use an algorithm to determine a relationship between pixels coordinates from the images $I_1$ and $I_2$ captured by each camera $C_1$ and $C_2$. System controller 220 estimates correct pixel alignment between images $I_1$ and $I_2$ using the relationship between pixel coordinates in the images $I_1$ and $I_2$ using an algorithm that compares pixel positions. In some examples, distinctive features are located in both of the images $I_1$ and $I_2$ and are matched to one another such that the matching refines the relationship in pixel positions between the pair of images. Using the relationship between pixel positions, images $I_1$ and $I_2$ are projectively transformed onto an image surface capable of displaying the composited and aligned image $I_1+I_2$. The projectively transformed image $I_1+I_2$ may also be smoothed or blended by algorithms that reduce parallax, lens distortion, scene motion, exposure differences, or any other detrimental image effects. In the PCA, the composite image may have a higher resolution than the original image. The higher resolution may enable a zooming function of the PCA.

Phased Video Compositing

Similarly, as camera technology has developed the frame rates at which digital cameras are able to capture video have increased. However, even with higher frame rates, users desire videos with frame rates greater than the cameras are able to capture. For example, traditional digital camera technology captures between 24 frames per second (fps) and 60 frames per second with high quality consumer cameras capturing up to 120 frames per second.

Cameras in a PCA may use electronic components internal to the cameras to create composite videos from several different cameras within the PCA. The frame rate in the composite video may be greater than the frame rate an individual camera of the PCA is configured to capture by using video phasing techniques. As an example, in this section, video compositing will be described with two cameras of a PCA, but use more than two cameras following a similar process.

To create composite videos captured by PCA cameras into a higher frame rate videos, a first camera of the PCA $C_1$ captures a first set of sequential images $I_{1a}$, $I_{1b}$, $I_{1c}$, $I_{1d}$ and a second camera of the PCA $C_2$ captures a second set of sequential images $I_{2a}$, $I_{2b}$, $I_{2c}$, $I_{2d}$. The cameras may be electronically coupled to one another via a communication medium, e.g., wires, Bluetooth, the internet, optical transmission technologies, or any other device to device communication network and protocol.

System controllers 220 of the cameras in the PCA may use an algorithm to determine the capture frame rates of each set of sequential images $I_1$ and $I_2$ captured by each camera $C_1$ and $C_2$. Alternatively, system controllers 220 may access time based meta-data associated with each image to determine a frame rate. One of, or both of, system controllers 220 then determines an image sequence interspersing $I_1$ and $I_2$ such that the frame rate increases, e.g. $I_{1a}$, $I_{2a}$, $I_{1b}$, $I_{2b}$, $I_{1c}$, $I_{2c}$, $I_{1d}$, $I_{2d}$. In alternative embodiments, the image sequence may be any combination of images determined by the processor; for example the sequence $I_{1a}$, $I_{1b}$, $I_{2a}$, $I_{2b}$, the sequence $I_{1a}$, $I_{1b}$, $I_{1c}$, $I_{2a}$, $I_{2b}$, $I_{2c}$, $I_{1d}$, $I_{2d}$, the sequence $I_{2a}$, $I_{1a}$, $I_{1b}$, $I_{2b}$, $I_{1c}$, $I_{2c}$, $I_{2d}$, $I_{1d}$, or any other sequence of images. The phased video sequence may also be smoothed or blended by algorithms that reduce parallax, lens distortion, scene motion, exposure differences, or any other detrimental image effects. In the PCA, the phased video may have a higher framerate than the framerate from an individual camera.

Phased Camera Arrays

A phased camera array (PCA) can be used to generate images and videos that have higher resolution and frame rates than traditional camera systems. A phased camera array is an array of cameras configured to capture images and videos in a manner such that the resulting image and videos, generally, have a resolution or frame rate higher than any of the cameras included in the array. Cameras in the camera array stagger their image/video capturing such that electronics of the phased camera array can stitch and composite (i.e., combine) high resolution images and videos from the staggered images and videos. Phased camera arrays can also use a keyframe camera centrally positioned in the camera array to assist in image stitching and video composition.

Keyframe Cameras

In the illustrated embodiments, a keyframe camera is centrally located to the other cameras of a PCA. A keyframe camera is more proximal to a center axis of the PCA than all other cameras in the PCA. The keyframe camera may be similarly configured to other cameras in the PCA or have independent configuration settings. The keyframe camera can be electronically coupled to the cameras of the array such that the cameras of the PCA may reference the images and videos being taken by the keyframe camera. Generally, the keyframe camera is used to take reference images and videos to be used by the other cameras in image stitching and video compositing processes.

Example Embodiments

Figure 4A:
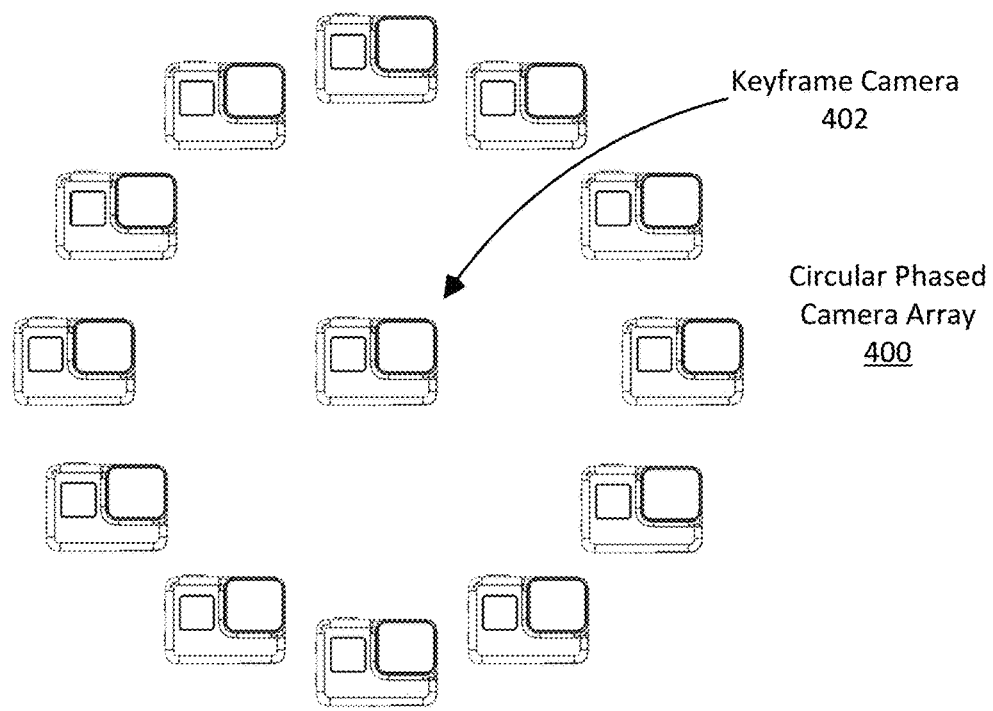
FIG. 4A illustrates a circularly shaped two-dimensional camera array with a centrally located keyframe camera, according to one example embodiment.
Figure 4B:
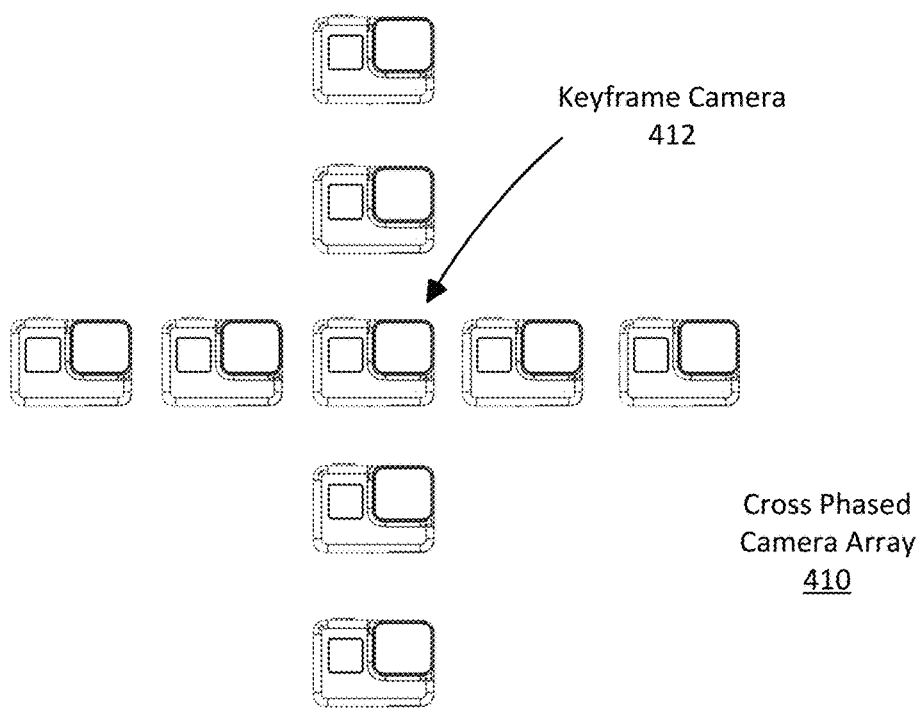
FIG. 4B illustrates a cross shaped two-dimensional camera array with a centrally located keyframe camera, according to one example embodiment.
Figure 4C:
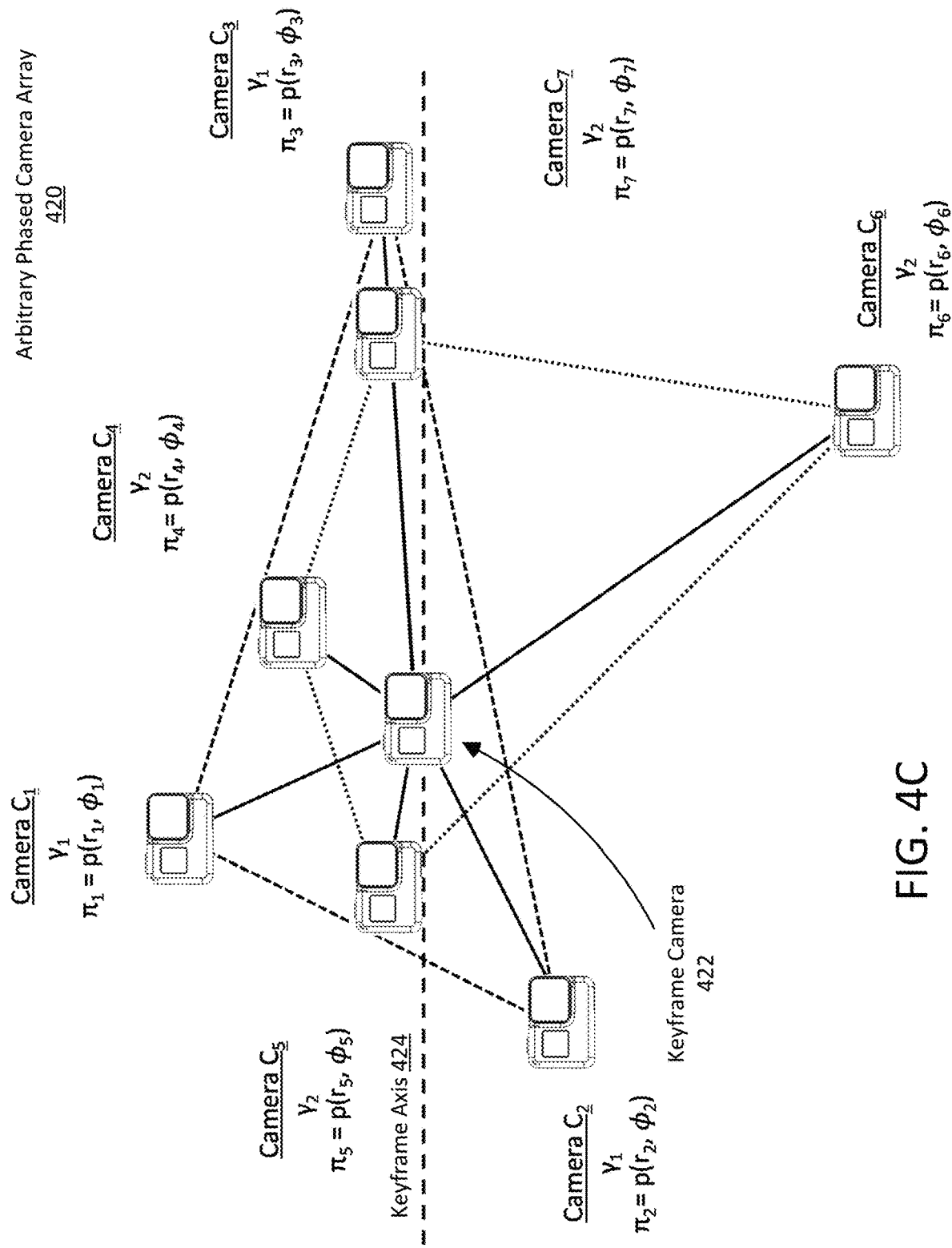
FIG. 4C illustrates an arbitrarily shaped two-dimensional camera array with a centrally located keyframe camera, according to one example embodiment.

FIGS. 4A-4C are example embodiments of a PCA that may be used to create high resolution composite images from lower resolution individual images using multiple cameras in the PCA. The embodiments may also be used to create higher frame rate composite videos from lower frame rate individual cameras.

FIG. 4A is a phased camera array 400 including a circular array of cameras surrounding a centrally located keyframe camera 402, according to one example embodiment. In phased camera array 400 the circular array of cameras represents a single group of cameras with the keyframe camera 402 at the center. In other configurations, the cameras of the circle can be split in to any number of groups.

FIG. 4B is a phased camera array 410 including a cross shaped array of cameras 410 with the camera at the center of the cross being the keyframe camera 412, according to one example embodiment. In phased camera array 410 there are two groups of cameras. The first group of cameras are the cameras proximal to the keyframe camera and the second group of camera are cameras once removed from the keyframe camera. In other configurations the cameras of the cross can be split in to any number of groups.

FIG. 4C illustrates a phased camera array 420 including an arbitrarily shaped array of cameras with the camera at the center of the array being the keyframe camera 422. In the illustrated array, each camera is part of a group $\gamma$ and has a position $\pi$. Cameras in a similar group are connected by similarly styled dashed lines. The keyframe camera 422 lies at reference point and on a keyframe axis 424. Each camera ($c_i$) in the PCA can have its position $p_{ci}$ (i.e., a sensor point) represented as $$\pi_{ci} = p(r_1, \phi_m) \qquad (1)$$

where $p(r_1, \phi_m)$ is the position of the camera $c_i$ in polar coordinates. Here, $r_1$ is the radial distance from the keyframe camera to camera $p_{ci}$, and $\phi_m$ is the angular orientation of the camera $p_{ci}$ relative to the keyframe axis 424.

In arbitrary PCA 420 there are two groups of cameras $\gamma_1$ and $\gamma_2$, with the first group $\gamma_1$ having three cameras and the second group $\gamma_2$ having four cameras. The cameras are positioned at radial distance $r_1$-$r_7$ and at angles of $\phi_1$-$\phi_7$.

Here, the number of cameras, the number of groupings, which cameras are in each grouping, and their positions are arbitrary and in various other configurations may be located at any position about the keyframe camera.

Camera Group Positioning

In various PCA configurations, groups of cameras can take any position about the keyframe camera. However, to avoid parallax (or any other negative effects caused by dissimilar camera positions) in images and videos captured by the PCA, the positions of the cameras in each group (i.e., sensor points) should surround the keyframe camera. That is, if each camera in the group is at a point, a representative boundary between adjacent points in the group (e.g., the dashed lines of FIG. 4C) can form a representative area (e.g., the enclosed polygon formed by similarly dashed lines of FIG. 4C). Keyframe cameras should be collinear with the representative boundaries or internal the representative area in a PCA.

As an example, in PCA 420, the first group of cameras creates a triangular representative area, and the second group of cameras creates a rhomboidal representative area. The representative shapes are arbitrary and based on the arbitrarily selected position of the cameras in PCA 420. In some embodiments there may be two cameras in a group, in such embodiments the cameras in the group should be approximately collinear with the key frame camera to avoid negative image effects during image processing.

FIGS. 5A-5E illustrate representative boundaries, representative areas, and keyframe cameras in example PCAs.

Figure 5A:
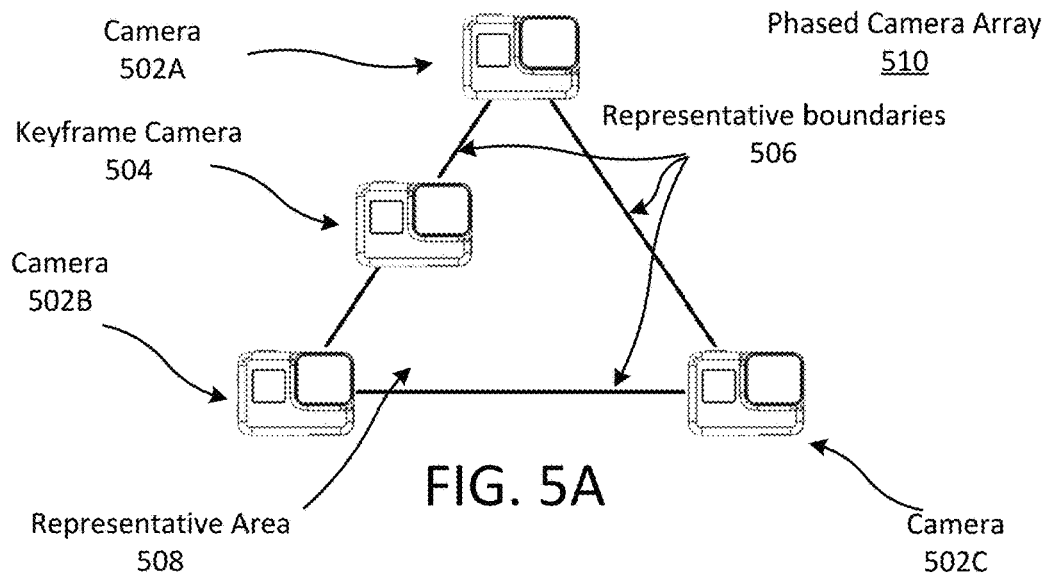
FIG. 5A illustrates a group of three cameras for image stitching with a keyframe camera collinear to two of the cameras of the group, according to one example embodiment.

FIG. 5A illustrates a PCA 500 including a set of three cameras 502A, 502B, and 502C and keyframe camera 504, according to one example embodiment. Each camera 502 is at a point and representative boundaries 506 form a triangular representative area 508. Keyframe camera 504 is at a reference point collinear with a representative boundary 506 between two cameras.

Figure 5B:
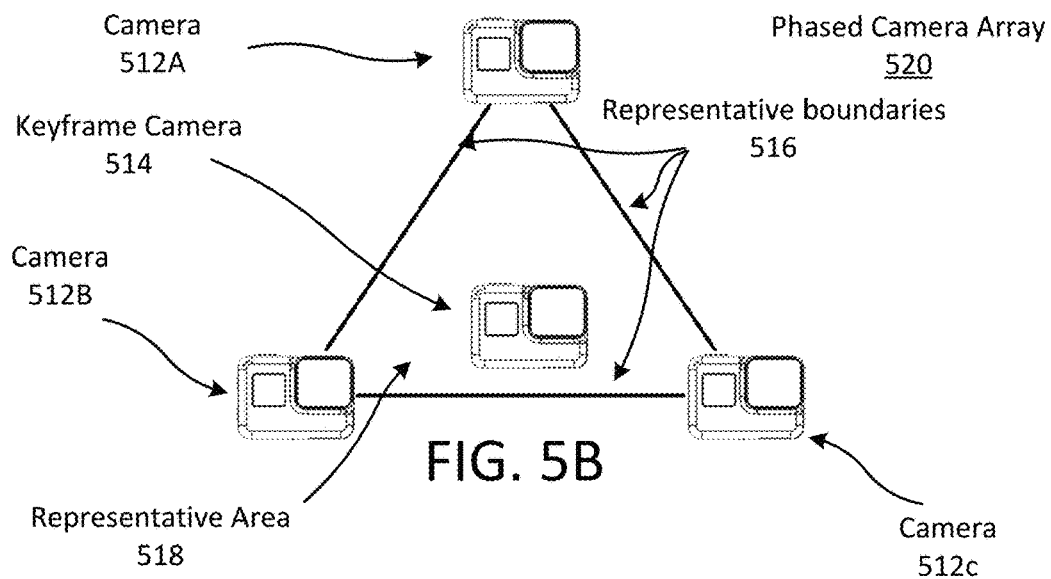
FIG. 5B illustrates a group of three cameras for image stitching with a keyframe camera internal to the representative area of the group, according to one example embodiment.

FIG. 5B illustrates a PCA 510 including a set of three cameras 512A, 512B, and 512C and keyframe camera 514, according to one example embodiment. Each camera 512 is at a point and representative boundaries 516 form a triangular representative area 518. Keyframe camera 514 is internal the representative area.

Figure 5C:
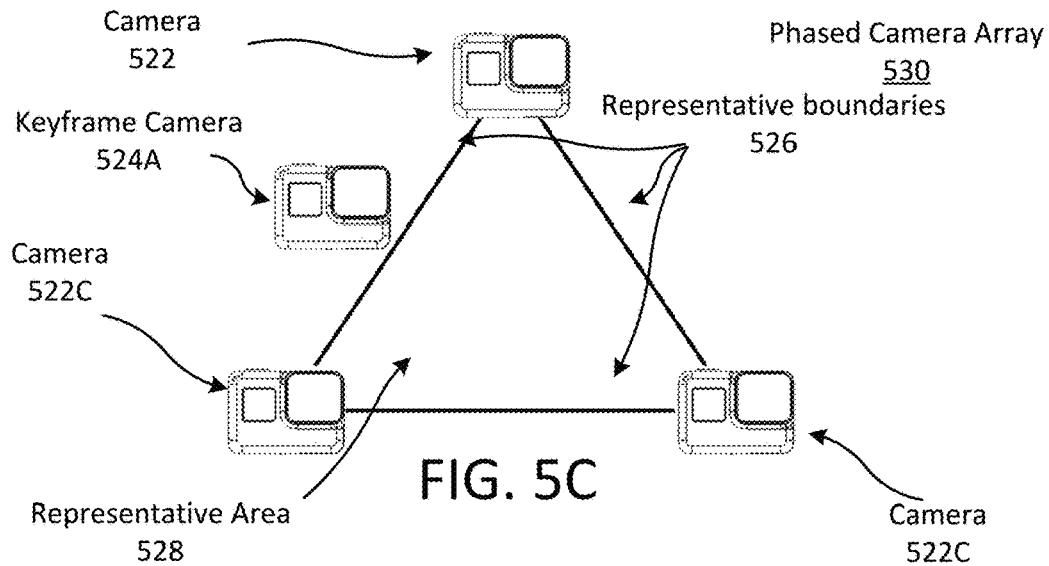
FIG. 5C illustrates a group of three cameras for image stitching with a keyframe camera external to the representative area of the group, according to one example embodiment.

FIG. 5C illustrates a PCA 520 including a set of three cameras 522A, 522B, and 522C and keyframe camera 524, according to one example embodiment. Each camera 522 is at a point and representative boundaries 526 form a triangular representative area 528. Keyframe camera 524 is external representative area 528.

The keyframe cameras 504, 514, and 524 are used as a reference image for image stitching and video compositing techniques. Keyframe cameras 504 and 514 can be used to reduce parallax, lens distortion, scene motion, exposure differences, or any other detrimental image effects because the keyframe cameras are within the representative area of the cameras. However, while keyframe camera 524 may be used as a reference image for the image stitching and video compositing techniques, reductions in parallax, lens distortion, scene motion, exposure differences, or any other detrimental image effects are reduced in this configuration because the keyframe camera is external the representative area of the cameras.

Figure 5D:
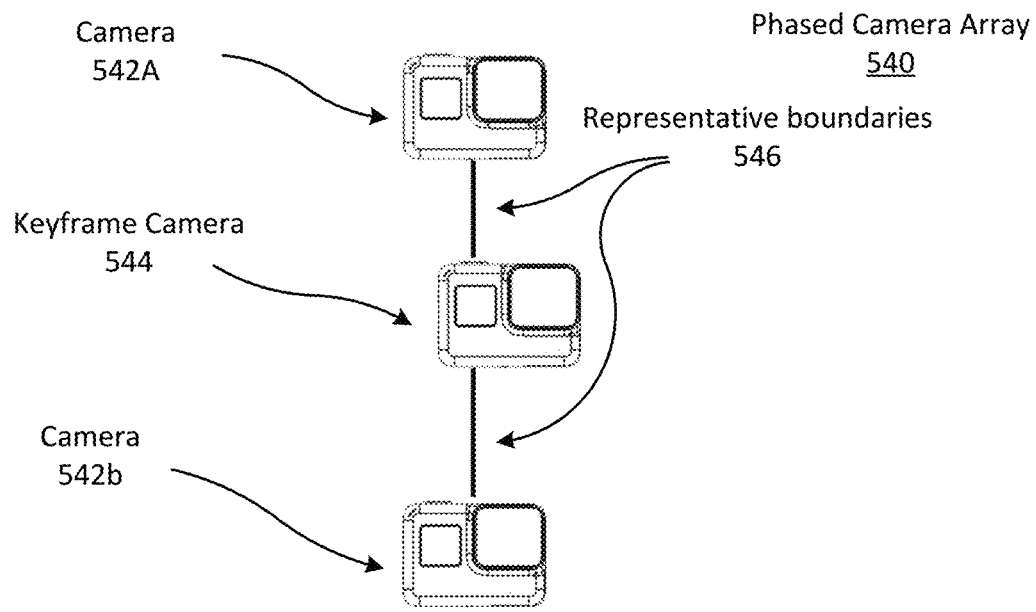
FIG. 5D illustrates a group of two cameras for image stitching with a keyframe camera collinear to the cameras of the group, according to one example embodiment.

FIG. 5D illustrates a PCA 540 including a set of two cameras 542A and 542B, and keyframe camera 544, according to one example embodiment. Each camera 542 is at a point and representative boundaries 546 form a line 548. Keyframe camera 544 is collinear with a representative boundary 546 between two cameras.

Figure 5E:
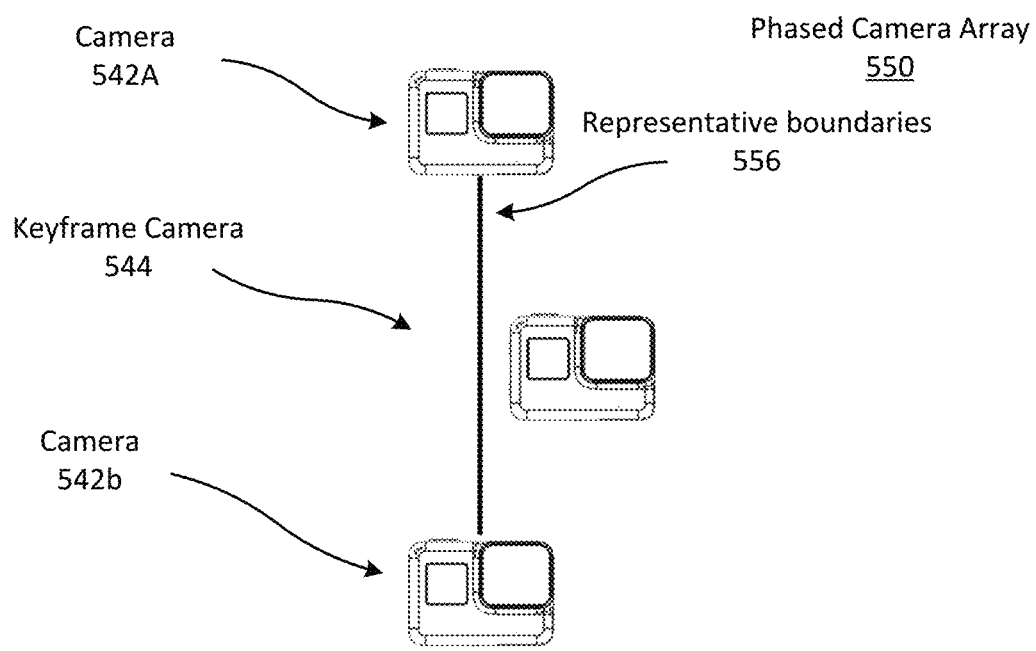
FIG. 5E illustrates a group of two cameras for image stitching with a keyframe camera non-collinear to the cameras of the group, according to one example embodiment.

FIG. 5E illustrates a PCA 550 including a set of two cameras 552A and 545B, and keyframe camera 554, according to one example embodiment. Each camera 552 is at a point and representative boundaries 556 form a line 548. Keyframe camera 554 is not collinear with a representative boundary 546 between two cameras.

Similarly to FIGS. 5D-5E, keyframe cameras 544 and 554 may be used as a reference image for the image stitching and video compositing techniques but reductions of parallax, lens distortion, scene motion, exposure differences, or any other detrimental image effects are reduced for keyframe camera 554. In general, a keyframe camera collinear to the line of two cameras in a PCA aids reduction of negative image effects more than a keyframe camera external to the line of two cameras in the PCA. In this case, the representative area can be taken as the line between the two cameras.

Triptych Phased Camera Array

The previously described camera arrays all have advantages and disadvantages. The PCA presented below minimizes the physical area the PCA occupies while simultaneously improving parallax, lens distortion, scene motion, exposure differences, or any other detrimental image effects.

Figure 6A:
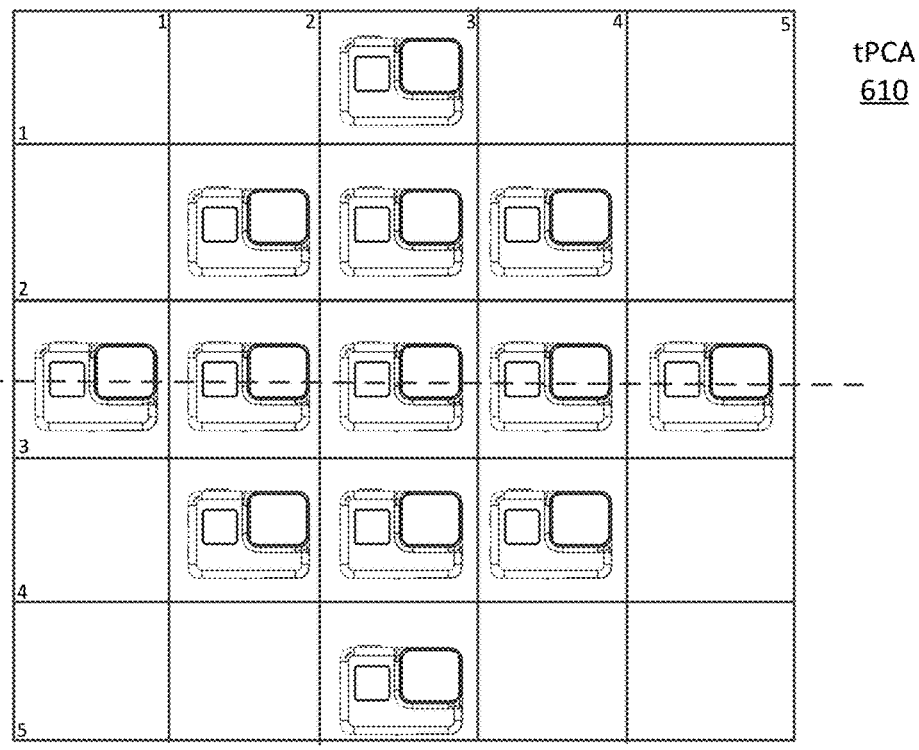
FIG. 6A illustrates a triptych phased camera array, according to one example embodiment.

FIG. 6A illustrates an example embodiment of a phased camera array 610. In the illustrated embodiment the PCA 610 is a set of thirteen cameras grouped into four sets (1-4) of three cameras (a-b) with a keyframe camera (KF). Hereafter, each group of three cameras is a triptych. The cameras of the PCA are configured such that they are oriented into five rows and five columns. The center of the third row represents the phased camera array axis. For the purpose of description, the rows are numbered 1-5 from top to bottom and the columns from 1-5 from left to right such that cameras of the tPCA may be described as $C(x,y)$ where x is the row and y is the column.

In the illustrated embodiment of FIG. 6A, there is one camera in the $1^{st}$ row in the $3^{rd}$ column (e.g. $C(1,3)$); three cameras in the $2^{nd}$ row in the $2^{nd}$-$4^{th}$ columns (e.g. $C(2,2)$, $C(2,3)$, and $C(2,4)$); five cameras in the $3^{rd}$ column in the $1^{st}$-$5^{th}$ columns (e.g. $C(3,1)$, $C(3,2)$, $C(3,3)$, $C(3, 4)$, and $C(3, 5)$); three cameras in the $4^{th}$ row in the $2^{nd}$-$4^{th}$ columns (e.g. $C(4, 2)$, $C(4, 3)$, and $C(4,4)$); and one camera in the $5^{th}$ row in the $3^{rd}$ column (e.g. $C(5,3)$). Hereafter, this configuration of PCA is described as the triptych phased camera array (tPCA).

In the illustrated embodiment of the tPCA 610, cameras are oriented such that the rows are substantially parallel, the columns are substantially parallel, the rows and columns are substantially orthogonal, and the rows and columns lie on a substantially flat two-dimensional surface. However, there are other possible configurations of the tPCA: there may be more or fewer than thirteen cameras, the rows may be non-parallel, the columns may be non-parallel, the rows and columns may be non-orthogonal, and the rows and columns may lie on a non-planar surface.

An example alternative embodiment may be a tPCA comprising 25 cameras. Here, the extra cameras similarly oriented in a substantially diamond shape with two extra rows and columns. That is the center rows and columns have six cameras rather than five. Additionally, in some example embodiments, the cameras are configured such that they lie on a surface of a hemisphere similar to a compound eye of an insect. In still other example embodiments, the cameras of the tPCA may be grouped in sets in any number greater than one such that the group of camera surrounds, or is substantially linear with, the keyframe camera.

Figure 6B:
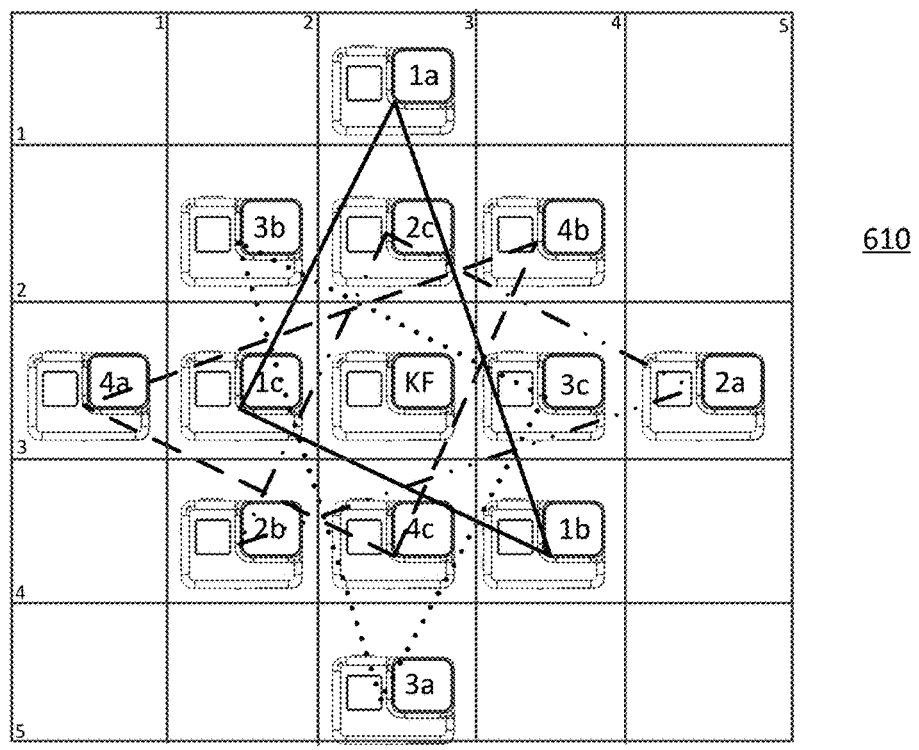
FIG. 6B illustrates the triptych phased camera array with four groups of three cameras and a keyframe camera, according to one example embodiment.

In the illustrated example of the tPCA 610 in FIG. 6B, the triptychs are configured such that cameras of each triptych are the vertices of a triangle with the keyframe internal to edges of the triangle. The vertices of the first triptych (1$a$, 1$b$, and 1$c$) are cameras C(1,3), C(3,2) and C(4,4); vertices of the second triptych (2$a$, 2$b$, and 2$c$) are cameras C(3,5), C(4,2) and C(2,3); vertices of the third triptych (3$a$, 3$b$, and 3$c$) are cameras C(5,3), C(2,2) and C(3,4); vertices of the fourth triptych (4$a$, 4$b$, and 4$c$) are cameras C(3,1), C(2,4) and C(4,3); and the keyframe camera (KF) is camera C(3,3). The vertices of the triptychs are non-unique and may be any combination of three cameras which surround the keyframe camera. In other embodiments, the cameras may be configured into three groups of four cameras, six groups of two cameras, or two groups of six cameras. Cameras of tPCA 610 can be used to capture high quality images and videos using image stitching and video composting as described herein.

Sequential Image Stitching

Sequential image stitching from a single camera is the basis for modern video technology. Sequential image stitching from cameras in a PCA can allow for increasing a frame rate $f_1$ of PCA cameras operating in conjunction relative to a frame rate $f_2$ of any camera of the PCA operating alone (i.e., $f_1 > f_2$).

Figure 7A:
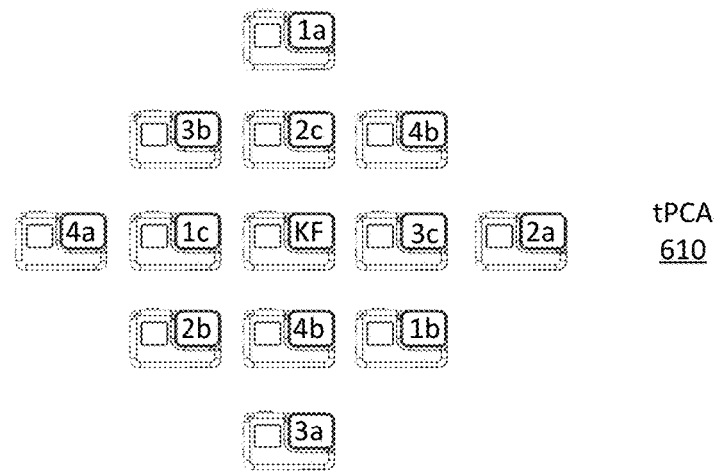
FIG. 7A illustrates the triptych phased camera array, according to one example embodiment.
Figure 7B:
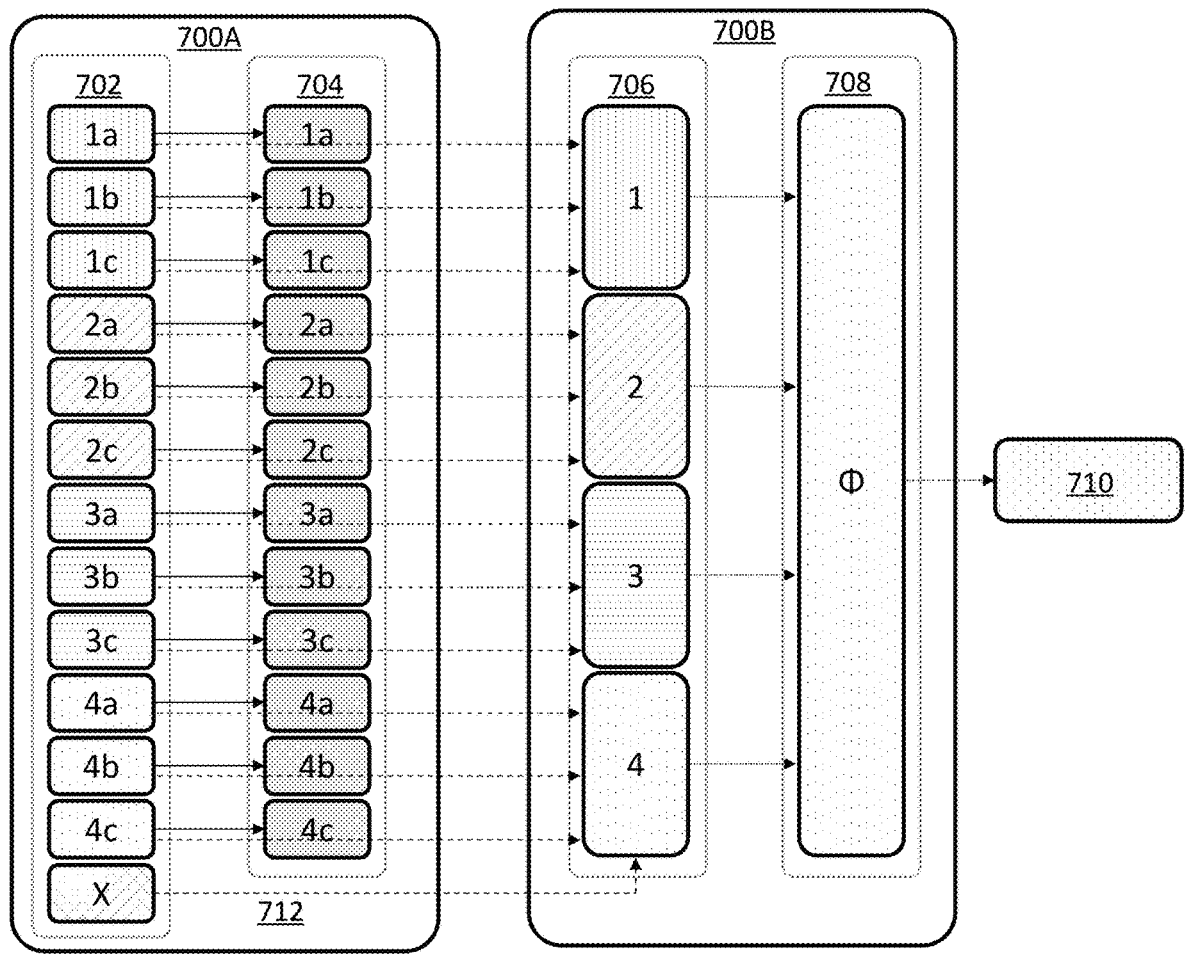
FIG. 7B illustrates the generation of a single composite video frame generated from stitched images taken from the triptych phased camera array, according to one example embodiment

FIGS. 7A-7C demonstrate an example embodiment of a tPCA capturing a video stream at 120 Hz at 4K resolution. FIG. 7A illustrates an embodiment of a tPCA 610 with thirteen cameras divided into four groups (1, 2, 3, 4) of three cameras (a, b, c) with a centrally located keyframe (KF) camera oriented similarly to FIG. 6B. In this example, each camera of the tPCA may be further configured to capture at a framerate and an image size less than 120 Hz at 4K resolution individually. The tPCA stitches and composites the images such that the resulting video stream is at 120 Hz at 4K resolution. In some configurations, the resolution of individual cameras in the tPCA may be 480p, 780p, or 1080p and the frame rates may be 15 Hz, 30 Hz, 60 Hz, etc.

FIG. 7B illustrates the formation of a single frame of the video stream, according to one example embodiment. The formation of the frame can be grouped into two sub-processes: image acquisition and storage 700A, and image processing and video interlacing 700B. The cameras of the tPCA capture images in a camera image stream 702. Here, each image is represented by a bounded box. The first group of cameras (1$a$, 1$b$, 1$c$) and keyframe camera (KF) simultaneously capture an image; subsequently, the second group of cameras (2$a$, 2$b$, 2$c$) simultaneously capture an image; subsequently, the third group of cameras (3$a$, 3$b$, 3$c$) simultaneously capture an image; subsequently, the fourth group of cameras (3$a$, 3$b$, 3$c$) capture an image. In FIGS. 7A and 7B Images simultaneously captured by a similar triptych are represented by boxes having the same background pattern. The images can be stored 704 in camera memory after they are captured. In FIG. 7A stored images are represented by bounded grey boxes.

The captured images are processed 706 such that captured images from each group of cameras form a higher quality stitched image, i.e. the images from the first group of cameras $I_{1a}$, $I_{1b}$, and $I_{1c}$ are stitched into a single image $I_1$ using techniques described previously. Similarly $I_{2a}$, $I_{2b}$, and $I_{2c}$ are stitched into a single image $I_2$; $I_{3a}$, $I_{3b}$, and $I_{3c}$ are stitched into a single image $I_3$; and $I_{4a}$, $I_{4b}$, and $I_{4c}$ are stitched into a single image $I_4$. The stitched images may be stored into the camera memory after they are processed.

Each group's stitched image is interlaced into a composite video frame Φ 708 such that the images will appear sequentially in time, i.e. $I_1$, $I_2$, $I_3$, $I_4$. The interlacing of the images into a composite video frame is configured to increase the frame rate of the overall sequence. For example, if all of the cameras are configured to capture at the same frame rate the cameras may be configured to capture images at different times. In the illustrated embodiment $I_1$ can be captured at $t_1 = 0.00$, $I_2$ can be captured at $t_2 = 0.25$, $I_3$ can be captured at $t_3 = 0.50$, and $I_4$ can be captured at $t_4 = 0.75$. The images are interlaced into a composite frame $I_{1,t1}$, $I_{2,t2}$, $I_{3,t3}$, $I_{4,t4}$. The composite frame is generally outputted to the composite video stream 710. The composite frame may be stored in the camera memory after the frame is interlaced.

The image from the keyframe camera, or the reference frame, may be referenced 712 at any point during image processing and video composition to minimize adverse image effects. In some embodiments, the reference frame may be stored in the camera memory.

FIG. 7C illustrates the generation of a video stream from sequentially captured camera frames, according to one example embodiment. Here, the video stream includes camera frames generated from the repetitive process of creating a camera frame as described in FIG. 6B. That is, each camera frame includes a sequential set of stitched images captured from tPCA 610.

In FIG. 7C, the first composite video frame $\Phi_1$ 720 is generated as follows: the first group of cameras (1$a$, 1$b$, and 1$c$) simultaneously capture independent images at $t_1 = 0.00$ which are stitched into a composite image $I_1$; the second group of cameras (2$a$, 2$b$, and 2$c$) simultaneously capture independent images at $t_2 = 0.25$ which are stitched into a composite image $I_2$; the third group of cameras (3$a$, 3$b$, and 3$c$) simultaneously capture independent images at $t_3 = 0.50$ which are stitched into a composite image $I_3$; the fourth group of cameras (4$a$, 4$b$, and 4$c$) simultaneously capture independent images at $t_4 = 0.75$ which are stitched into a composite image $I_4$. The images $I_1$, $I_2$, $I_3$, and $I_4$, are interlaced into the first composite video frame $\Phi_1$.

The second composite video frame $\Phi_2$ 722 is subsequently generated as follows: the first group of cameras (1$a$, 1$b$, and 1$c$) simultaneously capture independent images at $t_5 = 1.00$ which are stitched into a composite image $I_5$; the second group of cameras (2$a$, 2$b$, and 2$c$) simultaneously capture independent images at $t_6 = 1.25$ which are stitched into a composite image $I_{6,t6}$; the third group of cameras (3$a$, 3$b$, and 3$c$) simultaneously capture independent images at $t_7 = 1.50$ which are stitched into a composite image $I_7$; the fourth group of cameras (4$a$, 4$b$, and 4$c$) simultaneously capture independent images at $t_8 = 1.75$ which are stitched into a composite image $I_8$. The images $I_5$, $I_6$, $I_7$, and $I_7$, are interlaced into the second composite video frame $\Phi_2$ which is appended to the first composite video frame $\Phi_1$, e.g. the video stream is $\Phi_1$, $\Phi_2$.

The third composite video frame $\Phi_3$ 724 is subsequently generated as follows: the first group of cameras (1$a$, 1$b$, and 1$c$) simultaneously capture independent images at $t_9 = 2.00$ which are stitched into a composite image $I_9$; the second group of cameras (2$a$, 2$b$, and 2$c$) simultaneously capture independent images at $t_{10} = 2.25$ which are stitched into a composite image ho; the third group of cameras (3$a$, 3$b$, and 3$c$) simultaneously capture independent images at $t_{11} = 2.50$ which are stitched into a composite image $I_{11}$; the fourth group of cameras (4$a$, 4$b$, and 4$c$) simultaneously capture independent images at $t_{12} = 2.75$ which are stitched into a composite image $I_{12}$. The images $I_9$, $I_{10}$, $I_{11}$, and $I_{12}$, are interlaced into the third composite video frame $\Phi_3$ which is appended to the second composite video frame $\Phi_2$, e.g. the video stream is $\Phi_1$, $\Phi_2$, $\Phi_3$.

Thus, the subsequent generation of a video stream from the composite video frames (e.g. $\Phi_1$, $\Phi_2$, $\Phi_3$) yields a video stream of the stitched images in the order $I_1$, $I_2$, $I_3$, $I_4$, $I_5$, $I_6$, $I_7$, $I_8$, $I_9$, $I_{10}$, $I_{11}$, and $I_{12}$. In this configuration the $I_1$, $I_5$, and $I_9$ represent images captured from the triptych of cameras running at a 30 Hz; $I_2$, $I_6$, and $I_{10}$ represent images captured the triptych of cameras running at 30 Hz; $I_3$, $I_7$, and $I_{10}$ represent images captured by the third triptych of cameras running at 30 Hz; $I_4$, $I_8$; and $I_{11}$ represent images captured by the fourth triptych of cameras running at 30 Hz. The triptychs are configured to capture images such that the four triptychs are never simultaneously capturing images. This 'phasing' allows for the effective frame rate of the cameras to increase. In the illustrated example, the cameras are configured such that four cameras operating at 30 Hz generate a video stream of 120 Hz.

Alternative Configurations

One skilled in the art will recognize that, this process can apply to PCAs that are not similarly structured and configured to the tPCA in FIG. 7A. Any number of cameras in a group can be used to create one of the stitched images $I_i$ in a composite frame. Furthermore, each stitched image of a composite video frame may use a different number of cameras; e.g. $I_1$ may be from cameras 1a and 1b, while $I_2$ may be from cameras 2a, 2b, 2c, and 2d.

The camera groups may be configured to capture images at a different frequency, e.g. the first group may capture images at 15 Hz, the second group at 30 Hz, and the third and fourth groups at 60 Hz. This may cause the composite video frames to be a different combination of the composite images. For example, in one embodiment, the first group of cameras capture a series images at a first frequency $I_1$, $I_4$, $I_7$ and the second group of cameras capture a series of images at a second frequency $I_2$, $I_3$, $I_5$, $I_6$. The cameras are configured and phased such that the composite video frame is sequenced as $I_1$, $I_2$, $I_3$, $I_4$, $I_5$, $I_6$, $I_7$, with two frames from one camera group in succession as they are capturing at a higher frequency. One skilled in the art will note that a similar process of creating a video stream displaying at a higher frequency from cameras operating at any combination of lower frequencies is possible with a more complex phasing scheme.

Additional Configuration Considerations

The proposed configuration has several significant advantages over current technologies. For example this configuration realizes that the cameras comprising the phased camera arrays are, independently, substantially less capable than the cameras operating as a whole. For example, as cameras have progressed there are large amounts of relatively older camera sensors that have been fabricated that are no longer in general use due to their relative lower quality. The phased camera array takes low quality cameras and improves them by placing them in processor controlled configurations to increase the capability of the camera system as a whole. As an example, an array of thirty cameras that capture at 15 fps at 360p resolution may be configured to capture at 120 fps at 4K resolution by combining the image capturing capabilities of the cameras. Furthermore, the low quality cameras used in a phased camera array are, generally, less expensive to produce than an equivalent high quality camera or may be repurposed cameras that no longer have standalone commercial appeal.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a phased camera array as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera system comprising:
    a keyframe assembly configured to capture images during operation, the keyframe assembly located at a reference point;
    a plurality of image sensor assemblies positioned at a plurality of image sensor points, the plurality of image sensor assemblies each configured to capture one or more images during operation of the camera system, the plurality of image sensor assemblies grouped into a plurality of sensor subsets, a given sensor subset comprising at least two image sensor assemblies, the plurality of image sensor assemblies positioned such that, for the given sensor subset,
        a pair of sensor points of the plurality of sensor points between adjacent image sensor assemblies form a representative boundary line,
        the representative boundary lines formed between the sensor points form a representative boundary area, and the reference point of the keyframe assembly is within the representative boundary area; and a processor configured for data communication with the image sensor assemblies, the processor configured to:

receive image data associated with captured images from the keyframe assembly and the plurality of image sensor assemblies.

2. The camera system of 1, wherein the processor is further configured to:

generate a composite video segment from the received image data by causing the processor to, stitch images simultaneously captured by the image sensor assemblies in a subset of the plurality of sensor subsets into a stitched image, and combine the stitched images into the composite video segment; and output the composite video segment.

3. The camera system of 1, wherein, at least a portion of the image sensor assemblies of the plurality of image sensor assemblies are positioned in a shape of a rhomboid, the keyframe assembly at the center point of the rhomboid.

4. The camera of system of claim 1, wherein the representative boundary area of each sensor subset is substantially triangular.

5. The camera system of 1, wherein the system is further configured such that:

the image sensor assemblies of a first sensor subset of the plurality of subsets capture images at a first frame rate;

the image sensor assemblies of a second sensor subset of the plurality of subsets capture images at a second frame rate; and the processor generates a composite video segment with a third frame rate, the third frame rate higher than the first frame rate and the second frame rate.

6. The camera system of 1, wherein, the system is further configured such that:

the image sensor assemblies of a first sensor subset capture images at a first resolution; and wherein a stitched image simultaneously captured by the first sensor subset comprises a second resolution, the second resolution being higher than the first resolution.

7. The camera system of claim 1, wherein the plurality of sensor subsets comprises a first subset and a second subset, each of the first and second subsets comprising at least three image sensor points to create respective first and second representative boundary areas, the first and second representative boundary areas overlapping at least partially with each other.

8. The camera system of claim 1, wherein the second subset comprises at least four image sensor points, and the second representative boundary area comprises a rhomboidal shape.

9. The camera system of claim 1, wherein each of the plurality of image sensor assemblies is associated with a position relative to the keyframe assembly, the position being a function of at least (i) radial distance from the keyframe assembly, and (ii) an angular orientation relative to an axis associated with the keyframe assembly.

10. A method for generating a video from a camera system comprising a plurality of image sensor assemblies, the method comprising:

capturing a first reference image from a keyframe image sensor, the keyframe image sensor located at a reference point;

capturing a first set of simultaneous images from a first subset of the plurality of image sensor assemblies, the first subset of the plurality of image sensor assemblies located at a first set of sensor points, the first set of sensor points centrally located about the reference point;

combining the first set of simultaneous images into a first composite image;

capturing a second set of simultaneous images from a second subset of the plurality of image sensor assemblies, the second subset of the plurality of image sensor assemblies located at a second set of sensor points, the second set of sensor points centrally located about the reference point and dissimilar from the first set of sensor points;

combining the second set of simultaneous images into a second composite image;

generating a first composite video segment by joining the first composite image and the second composite image; and outputting the first composite video segment.

11. The method of 10 wherein, the plurality of image sensor assemblies is substantially rhomboidal, with the keyframe assembly at the center point of the rhomboid.

12. The method of 10 further comprising:

capturing the first subset of the plurality of image sensor assemblies captures images at a first frame rate;

capturing the second subset of the plurality of image sensor assemblies captures images at a second frame rate; and generating a composite video segment with a third frame rate, the third frame rate higher than the first and the second frame rate.

13. The method of 10 further comprising:

capturing the first subset of the plurality of image sensor assemblies captures images at a first resolution; and combining the first set of simultaneous images into the first composite image with a second resolution, the second resolution higher than the first resolution.

14. The method of 10 further comprising:

capturing the second subset of the plurality of image sensor assemblies captures images at a third resolution; and combining the first set of simultaneous images into the first composite image with a fourth resolution, the fourth resolution higher than the third resolution.

15. The method of 10 wherein, each image sensor assemblies of the first sensor subset of the plurality of image sensor assemblies captures images at an independently configurable framerate and resolution.

16. The method of claim 10, wherein:

the first subset of the plurality of image sensor assemblies is arranged so as to create a first bounded area within the first set of sensor points, the first subset of the plurality of image sensor assemblies comprising three or more image sensor assemblies; and the first bounded area is placed about the keyframe image sensor such that the reference point is within the first bounded area.

17. The method of claim 16, wherein:

the second subset of the plurality of image sensor assemblies is arranged so as to create a second bounded area within the second set of sensor points, the second subset of the plurality of image sensor assemblies comprising three or more image sensor assemblies; and the second bounded area is placed about the keyframe image sensor such that the reference point is within both of the first and second bounded areas.

18. A computer program product for generating a video from a camera system comprising of a plurality of image sensor assemblies, the computer program product comprising a non-transitory machine-readable medium storing computer program code, the program code being configured to, when executed by at least one processor, cause the camera system to:
- capture a first reference image from a keyframe image sensor, the keyframe image sensor located at a reference point;
- capture a first set of simultaneous images from a first subset of the plurality of image sensor assemblies, the first subset of the plurality of image sensor assemblies located at a first set of sensor points, the first set of sensor points centrally located about the reference point;
- combine the first set of simultaneous images into a first composite image;
- capture a second set of simultaneous images from a second subset of the plurality of the image sensor assemblies, the second subset of the plurality of image sensor assemblies located at a second set of sensor points, the second set of sensor points centrally located about the reference point and dissimilar from the first set of sensor points;
- combine the second set of simultaneous images into a second composite image;
- generate a first composite video segment by joining the first composite image and the second composite image; and
- output the first composite video segment.

19. The computer program product of claim 18, wherein the program code is further configured to, when executed by the at least one processor, the camera system to:
- capture the first subset of image sensor assemblies captures images at a first frame rate;
- capture the second subset of image sensor assemblies captures images at a second frame rate; and
- generate a composite video segment with a third frame rate, the third frame rate higher than the first and the second frame rate.

20. The computer program product of claim 18, wherein:
- the first set of sensor points is configured to form a first representative area bounded by at least three points;
- the second set of sensor points is configured to form a second representative area bounded by at least three points; and
- the reference point of the keyframe image sensor is placed within an overlapping area of the first and second representative areas.

21. The computer program product of claim 18, wherein the program code is further configured to, when executed by the at least one processor, the camera system to:
- determine a position of each sensor point of the first and second set of sensor points, the determination of the position comprising a determination of a radial distance and an angular orientation for each sensor point.

* * * * *